United States Patent [19]

Hensel et al.

[11] Patent Number: 4,606,976

[45] Date of Patent: Aug. 19, 1986

[54] SUBSTANTIALLY SCRATCH-FREE POLYESTER MULTILAYER FILM

[75] Inventors: Hartmut Hensel, Schlangenbad; Helmut Monzer, deceased, late of Wiesbaden, both of Fed. Rep. of Germany, by Jana Monzer, Daniel Monzer, legal representatives

[73] Assignee: American Hoechst Corporation, Somerville, N.J.

[21] Appl. No.: 723,684

[22] Filed: Apr. 16, 1985

[30] Foreign Application Priority Data

Apr. 16, 1984 [DE] Fed. Rep. of Germany ....... 3414309

[51] Int. Cl.$^4$ .................... B32B 27/06; B32B 27/36
[52] U.S. Cl. ..................... 428/480; 428/482; 428/910; 528/272; 156/244.11; 156/244.24; 264/171; 264/173; 264/345
[58] Field of Search ............ 428/480, 482, 910

[56] References Cited

U.S. PATENT DOCUMENTS

| 4,218,510 | 8/1980 | Wilson | 428/910 X |
| 4,375,494 | 3/1983 | Stokes | 428/910 X |
| 4,398,642 | 8/1983 | Okudaira et al. | 428/480 X |
| 4,482,586 | 11/1984 | Smith et al. | 428/480 X |
| 4,535,025 | 8/1985 | Jabarin | 428/910 X |

Primary Examiner—Lucille M. Phynes
Attorney, Agent, or Firm—James C. Lydon

[57] ABSTRACT

A biaxially oriented thermo-fixed multilayer film is described, consisting of thermoplastic polyester materials having different melting points and having an essentially scratch-free surface. The characterizing features of the multilayer film described consist in the fact that a cover layer of a polyester B is applied to at least one surface of a base layer of thermoplastic polyester A, said polyester B having a lower melting point than polyester A, and by the fact that no scratches longer than 3.0 mm and greater than 10 microns in cross-section are present on the surface of the cover layer.

12 Claims, No Drawings

SUBSTANTIALLY SCRATCH-FREE POLYESTER MULTILAYER FILM

BACKGROUND OF THE INVENTION

The invention relates to a biaxially oriented and thermofixed multilayer film of thermoplastic polyesters with different melting points, having at least one essentially scratch-free surface.

Scratch-free films of especially high quality are required for optical applications, this being understood in particular to mean films for reprographic purposes or films for covering window glass, but carrier films which are essentially free of disturbing scratches are also required for application of metal coatings or magnetic coatings.

To produce scratch-free films, a production technology is normally used in which relative motion between the film strip and any rollers in the machine is suppressed during the entire manufacturing process of the film. In addition, friction between the individual film layers on the roll must be absolutely avoided. These requirements make it necessary to mount expensive attachments to production machinery, but nevertheless scratching of the film and consequently useless products occur especially during lengthwise stretching over rollers.

Scratches which render use of the film impossible also occur during subsequent processing of the films by customers.

The object of the present invention is to eliminate the problems involved in manufacturing scratch-free films by producing a film in which it is possible both to remove any scratches produced during film manufacture by a simple after-treatment integrated into the process, thus producing a perfect film surface, and also to produce a film with self-healing effects for any scratches that may occur during subsequent processing.

SUMMARY OF THE INVENTION

The present invention relates to a substantially scratch-free, multilayer polyester film comprising
  (i) a biaxially oriented polyester substrate,
  (ii) at least one polyester cover layer which is applied to at least one surface of said polyester substrate,
with the following provisos:
  (a) that the melting point of said polyester cover layer is lower than the melting point of said polyester substrate,
  (b) that the surface of said polyester cover layer is substantially free of scratches having a length greater than 3.0 mm and a cross-section greater than 10 microns.

The present invention also relates to a process of producing substantially scratch-free, multilayer film comprising
  (i) plasticizing the resins which are to form the layers of said multilayer film in separate extruders,
  (ii) combining said plasticizing resins and extruding them through a nozzle, thereby forming a multilayer extrudate;
  (iii) contacting said extrudate with a cooling roller thereby cooling said extrudate in an unstretched condition;
  (iv) biaxially orienting said multilayer extrudate, thereby forming a multilayer film;
  (v) heat-fixing said multilayer film at a temperature in the range between the melting points of the two layers of said multilayer film.

The present invention further relates to a process for substantially removing scratches from the surface of a multilayer film having a biaxially oriented polyester substrate and at least one polyester cover layer applied to at least one surface of said polyester substrate, said polyester cover layer having a lower melting point than said polyester substrate, comprising heating said scratched multilayer film to a temperature from 70° to 200° C. for a time sufficient to substantially remove said scratches.

DETAILED DESCRIPTION OF THE INVENTION

The object recited hereinabove is achieved according to the invention by a film of the species recited at the outset, whose characterizing features consist in the fact that a cover layer of a polyester B is applied to at least one surface of a base layer of thermoplastic polyester A, said polyester B having a lower melting point than polyester A, and by the fact that no scratches greater than 3.0 mm long and more than 10 microns in cross-section are present on the surface of the cover layer.

Thermoplastic polyester A of the base layer is polyethylene terephthalate in particular. To improve the slip characteristics, finely distributed solid particles may be added to the polyethylene terephthalate, especially in an amount from 0 to 30 wt. % preferably from 0 to 2 wt. %, based on the weight of the polyethylene terephthalate forming the base layer. The average particle size of the solid particles is in the range from 0.3 to 20 microns, preferably from 0.5 to 10 microns.

The particles can be of an inorganic material or also an organic material, but precipitates of catalyst residues or mixtures of all three types of particles may be used. Examples include one or more of the following materials: silicone dioxide, for example pyrogenic silicon dioxide, aerogel silicon dioxide, natural silicon dioxide, precipitated silicon dioxide, and diatomaceous earth silicon dioxide; synthetic and natural silicates; natural and pyrogenic aluminum oxide; calcium carbonate; barium sulfate; titanium dioxide; carbon black; metal particles as for example those of aluminum, iron, or the like; magnetic particles as for example barium ferrite, particles of polymer materials such as plastomers, elastomers, and duromers.

The solid particles have no influence on the melting range of the polyethylene terephthalate of the base coat, which is preferably between 240 and 260° C.

Organic additives with a low melting point (by comparison to polyester A) may be added to polyester A to improve the slip properties, especially in an amount from 0 to 10 wt. %, preferably in an amount from 0 to 5 wt. %. Examples include one or more of the following materials: glycerin mono-, di-, or triester, fatty acids, esters of fatty acids, saturated organic acids, their esters and salts, saturated and unsaturated organopolysiloxanes. Such additives can also influence the crystallinity of the polyester.

The layer thickness of the base coat is between 5 to 500 microns, preferably between 5 and 150 microns, especially preferably between 8 and 100 microns.

A cover layer of a polyester B with a lower melting point than that of polyester A is applied to at least one surface of the base layer. In particular, polyester B may comprise a copolyester of polyethylene terephthalate/- polyethylene isophthalate having an isophthalate percentage in the range from 5 to 95 wt. % based on the total weight of polyester B, preferably 5 to 30 wt. %, especially preferably between 10 and 20 wt. %. The melting point of polyester B preferably lies in the range from 190 to 230° C., especially preferably from 190 to 210° C.

Finely distributed solid particles can be also embedded in the cover layer to improve the slip properties of the film.

The solid particles may be made of the same materials as already described for base layer A, but the same particles need not always be used for the base layer and the cover layer, but particles made of materials other than those incorporated in the base layer may be used for the cover layer.

The quantity of solid particles that can be embedded in polyester B of the cover layer is in the range from 0 to 30 wt. %, preferably from 0 to 2.0 wt. %, based on the total weight of polyester B forming the cover layer. The average particle diameter is therefore in the range from 0.1 to 20 microns, preferably from 0.2 to 5 microns.

In addition, to improve slip properties, organic additives with a low melting point (by comparison to polyester B) may be added to the cover layer, especially in an amount from 0 to 10 wt. %, preferably in an amount from 0 to 5 wt. %. Examples include one or more of the following materials: glycerin mono-, di-, or triester, fatty acids, esters of fatty acids, saturated organic acids, their esters and salts, saturated and unsaturated organopolysiloxanes. Such additives can also influence the crystallinity of the polyester.

The layer thickness of the cover layer is at least 0.01 micron, preferably between 0.1 and 100 microns, especially preferably between 0.1 and 40 microns.

The free surface of the cover layer, i.e. the surface facing away from the base layer, has no scratches in the size ranges specified. The term "scratches" is understood within the scope of the specification of the invention to refer in particular to grooves, furrows, notches or other deformities in the otherwise essentially smooth film surface, which have a length of at least 3 mm, preferably at least 1 mm and whose cross-section is at least 10 microns, preferably at least 50 microns. Such scratches are clearly visible when the surface of the film is viewed under a microscope with a suitable magnification.

In an especially preferred embodiment of the invention, cover layers are applied to both sides of the base layer, whereby the composition of the polyester of the cover layers can differ within the ranges specified hereinabove, in exactly the same way as the cover layers applied to the two surfaces of the base layer can have different layer thicknesses, but preferably the total film has a symmetric structure, wherein both cover layers have the same composition and the same layer thickness.

In the preferred embodiment of the invention, the two free surfaces of cover layers are in scratch-free form.

The scratch-free surface of the multilayer film according to the invention, in addition to the special composition of the cover layers, is in particular the result also of the special manufacturing process for the multilayer film according to the invention which is produced by the extrusion method, preferably the coextrusion method. In this method, the polymers forming the individual layers of the carrier film are plasticized in separate extruders, brought together, and then extruded onto a cooling roller through a nozzle and the unstretched film is then cooled. After cooling, the film is oriented lengthwise and crosswise by multiple stretching, thermofixed, cut, and wound.

The characterizing feature of the manufacturing method according to the invention lies in the fact that the heat fixing of the multilayer film after stretching is performed at a temperature which is in the range between the melting point of polyester A and the melting point of polyester B. Preferably the film, after heat fixing, is brought to room temperature as rapidly as possible by quenching, especially preferably in a time interval of no more than 40 seconds to a maximum temperature of 70° C.

It has surprisingly been found that all scratches that may be produced in the course of film production on the surface of the film disappear after heat fixing according to the invention. This is explained by the fact that the heat fixing is carried out at a temperature which is above the melting point of the polyester B forming the cover layer. The melting of the polyester in the cover layers causes any scratches that may be present to disappear.

Melting the polyester in the cover layer(s) and the resultant rapid cooling of the film means that the polyesters in the cover layers are in a state of lower crystallinity. Such a state is comparable with that of a pre-film which has not been stretched. The cover layers are then very flexible and readily shaped, whereby they will spring back to their original positions after being subjected to mechanical stress. Such a state is also referred to as ductile and/or elastic, and is the opposite of hard and brittle.

Especially surprisingly it has been found that in the multilayer films described, any scratches that appear subsequently in the finished film can be eliminated by heat treatment at a temperature in the range from 70 to 200° C., preferably from 70 to 150° C. Such heat treatment offers the processor the opportunity to produce films with completely scratch-free surfaces, e.g. before metal evaporation or before applying additional coatings to the film, if new scratches or damage have been caused by rerolling, cutting, relative movements on rollers, etc.

EXAMPLES

The following embodiments are intended to describe the invention in greater detail, and are not intended to limit the invention in any way. Unless otherwise mentioned, the percentages are always in wt. %. The melting points were determined using a Du Pont DTA 1090 differential calorimeter.

EXAMPLES 1 to 7 (COMPARATIVE EXAMPLES)

A polyethylene terephthalate with a melting point of 255° C. was melted in an extruder and fed to a wide-slot nozzle. The film of melt emerging from the wide-slot nozzle, 120 microns thick, was cooled on a cooled roller. The resultant pre-film was heated to 80° C. and fed to a lengthwise stretcher. The latter consisted of two retaining roller devices arranges in series, whereby the rollers of the following device rotated at a higher speed than the first. The film was stretched lengthwise 300% by the difference in circumferential velocity of these driven retaining rollers. The film, stretched lengthwise, was then stretched crosswise at 100° C. 3.3 times in a stretching frame, heat-fixed at 120, 150, 170, 190, 210, 230, and 245° C. and cooled. Film could not be produced at fixing temperatures in the vicinity of 255° C. because cracks developed. When viewed under the microscope, both sides of the film show scratches.

TABLE I

| Example | Heat Fixing of film, °C. | Scratches observed under the microscope |
|---|---|---|
| 1 | 120 | + |
| 2 | 150 | + |
| 3 | 170 | + |
| 4 | 190 | + |
| 5 | 210 | + |
| 6 | 230 | + |
| 7 | 245 | + |

+ = scratches seen.

EXAMPLES 8 to 14

A polyethylene terephthalate with a melting point of 255° C. (A) was melted in an extruder and fed to a wide-slot nozzle together with a polyester B melted in the second extruder. Polyester B was copolyester consisting of 18 wt. % ethylene isophthalate and 82 wt. % ethylene terephthalate with a melting point of 210° C. Polyester (B) was applied to one side of polyethylene terephthalate (A) by means of a two-layer coextrusion adaptor. The melted film emerging from the broad-slot nozzle with structure AB was 130 microns thick (15 microns layer B, 115 microns layer (A) was cooled, heated, stretched lengthwise, stretched crosswise, and heat-fixed and cooled at temperatures of 120, 150, 170, 190, 210, 230, and 245° C., as described in Example 1. At fixing temperatures in the range of 255° C., the film could not be produced because of the cracks which occurred, as in Examples 1 to 7. When the films were viewed under the microscope, the following were observed:

TABLE II

| Example | Heat fixing of °C. | Scratches observed under the microscope | |
|---|---|---|---|
| | | Side A | Side B |
| 8 | 120 | + | + |
| 9 | 150 | + | + |
| 10 | 170 | + | + |
| 11 | 190 | + | + |
| 12 | 210 | + | − |
| 13 | 230 | + | − |
| 14 | 245 | + | − |

+ = scratches seen
− = no scratches seen

EXAMPLES 15 to 21

A polyethylene terephthalate with a melting point of 255° C. (A) was melted in an extruder and fed to a wide-slot nozzle together with a polyester (B) melted in a second extruder. Polyester B was a copolyester consisting of 18 wt. % ethylene isophthalate and 82 wt. % ethylene terephthalate with a melting point of 210° C. Polyester (B) was applied to both sides of polyethylene terephthalate (A) by a three-layer coextrusion adapter. The film of melt emerging from the broad-slot nozzle with structure BAB was 120 microns thick (15 microns layer B, 90 microns layer A) was cooled, heated, stretched lengthwise, stretched crosswise, heat-fixed, and cooled at temperatures of 120, 150, 170, 190, 210, 230, and 245° C. as described in Examples 1 to 7. Film could not be produced at fixing temperatures in the vicinity of 255° C. because of the cracks which appeared as in Examples 1 to 14. When the films were viewed under the microscope, the following was observed:

TABLE III

| Example | Heat fixing of film °C | Scratches under the microscope | |
|---|---|---|---|
| | | Side A | Side B |
| 15 | 120 | + | + |
| 16 | 150 | + | + |
| 17 | 170 | + | + |
| 18 | 190 | + | + |
| 19 | 210 | − | − |
| 20 | 230 | − | − |
| 21 | 245 | − | − |

+ = scratches seen
− = no scratches seen

EXAMPLE 22 (COMPARISON)

Films produced by Examples 1 to 7 were placed on a heating stage where changes in the film surface could be observed under a microscope. The films were scratched at room temperature. The surfaces became scratch-free once again only above the melting point of polyester A (255° C.).

EXAMPLE 23 (COMPARISON EXAMPLE)

Films produced according to Examples 1 to 7 were additionally damaged on one side with steel wool and then placed on a heating stage, whereby the changes in the film surfaces could be observed under a microscope. The films showed more scratches at room temperature than those which had not been treated with steel wool. The surfaces again became scratch-free once again only above the melting point of polyester A (255° C.). The data is disclosed in Table IV.

EXAMPLE 24

Films produced according to Example 8 to 14 were additionally damaged with steel wool and then placed on a heating stage, whereby the changes in the surfaces of the films were observed under a microscope. It was found that the films damaged using steel wool on the side of the film with polyester B (lower melting point), which were heat-fixed above the melting point of polyester B, again became scratch-free above approximately 100° C. On the other hand, the scratches caused by scratching with steel wool remained on the side of the film with polyester B (low melting point) which were heat fixed below the melting point of polyester B, as did the scratches on the polyester A side up to the melting point of polyester B or polyester A. The data is disclosed in Table V.

TABLE IV

| | Scratches on Surface of Polyester A (Melting Point 255° C.) | | | | | | | |
|---|---|---|---|---|---|---|---|---|
| Films Produced Using Example/Fixing Temperature °C. | Film Surface Before Steel Wool Treatment | After Steel Wool Treatment Temperature of Hot Table °C. | | | | | | |
| | | 25 | 50 | 75 | 100 | 125 | 230 | 260 |
| 1/120 | + | +++ | +++ | +++ | +++ | +++ | +++ | − |
| 2/150 | + | +++ | +++ | +++ | +++ | +++ | +++ | − |

TABLE IV-continued

Scratches on Surface of Polyester A (Melting Point 255° C.)

| Films Produced Using Example/Fixing Temperature °C. | Film Surface Before Steel Wool Treatment | After Steel Wool Treatment Temperature of Hot Table °C. | | | | | | |
|---|---|---|---|---|---|---|---|---|
| | | 25 | 50 | 75 | 100 | 125 | 230 | 260 |
| 3/170 | + | +++ | +++ | +++ | +++ | +++ | +++ | − |
| 4/190 | + | +++ | +++ | +++ | +++ | +++ | +++ | − |
| 5/210 | + | +++ | +++ | +++ | +++ | +++ | +++ | − |
| 6/230 | + | +++ | +++ | +++ | +++ | +++ | +++ | − |
| 7/240 | + | +++ | +++ | +++ | +++ | +++ | +++ | − |

\+ = Scratches
\+++ = Heavy Scratches
− = No Scratches

TABLE V

Scratches on Surface of Polyester B

| Films Produced Using Example/Fixing Temperature °C. | Before Steel Wool Treatment | After Steel Wool Treatment Temperature of Hot Table °C. | | | | | | | | | |
|---|---|---|---|---|---|---|---|---|---|---|---|
| | | 25 | 50 | 75 | 100 | 125 | 150 | 180 | 200 | 230 | 260 |
| 8/120 | + | +++ | +++ | +++ | +++ | +++ | +++ | +++ | +++ | − | − |
| 9/150 | + | +++ | +++ | +++ | +++ | +++ | +++ | +++ | +++ | − | − |
| 10/170 | + | +++ | +++ | +++ | +++ | +++ | +++ | +++ | +++ | − | − |
| 11/190 | + | +++ | +++ | +++ | +++ | +++ | +++ | +++ | +++ | − | − |
| 12/210 | − | +++ | +++ | + | − | − | − | − | − | − | − |
| 13/230 | − | +++ | +++ | + | − | − | − | − | − | − | − |
| 14/245 | − | +++ | +++ | + | − | − | − | − | − | − | − |

\+ = Scratches
\+++ = Heavy Scratches
− = No Scratches

It is claimed:

1. A substantially scratch-free, multilayer polyester film comprising
   (i) a biaxially oriented polyester substrate
   (ii) at least one polyester cover layer which is applied to at least one surface of said polyester substrate with the following provisos
      (a) that the melting point of said polyester cover layer is lower than the melting point of said polyester substrate
      (b) that the surface of said polyester cover layer is substantially free of scratches having a length greater than 3.0 mm and a cross-section greater than 10 microns.

2. The substantially scratch-free, multilayer polyester film of claim 1 wherein said polyester substrate has a melting point in the range of from 230 to 270° C. and said polyester cover layer has a melting point in the range of from 120 to 230° C.

3. The scratch-free, multilayer polyester film of claim 1 wherein said polyester substrate comprises polyethylene terephthalate having from 0 to 30% weight percent, based upon the weight of the polyethylene terephthalate forming said polyester substrate, of solid particles having an average particle size of from 0.3 to 20 microns.

4. The substantially scratch-free, multilayer polyester film of claim 3 herein the average particle size of said solid particles is from 0.5 to 10 microns.

5. The substantially scratch-free multilayer film of claim 1 wherein the thickness of said polyester substrate is from 2 to 500 microns.

6. The substantially scratch-free, multilayer film of claim 5 wherein the thickness of said polyester substrate is from 5 to 150 microns.

7. The substantially scratch-free, multilayer film of claim 1 wherein said polyester cover layer comprises a terephthalate/isophthalate copolyester having from 5 to 95 weight percent isophthalate, based on the total weight of the copolyester.

8. The substantially scratch-free, multilayer film of claim 7 wherein the melting point of said copolyester is from 190 to 230° C.

9. The substantially scratch-free, multilayer film of claim 1 wherein said polyester cover layer has from 0 to 30 weight percent, based upon the weight of the polymer forming said polyester cover layer, of solid particles having an average particle diameter of from 0.1 to 20 microns.

10. The substantially scratch-free, multilayer film of claim 1 wherein said polyester cover layer has a thickness of at least 0.01 micron.

11. The substantially scratch-free, multilayer film of claim 1 further comprising from 0 to 10 weight percent, based upon the total weight of the polyester forming the film, of at least one slip additive selected from the group consisting of glycerine monoesters, glycerine diesters, glycerine triesters, fatty acids, esters of fatty acids, saturated organic acids, esters of saturated organic acids, salts of saturated organic acids, saturated organopolysiloxanes, and unsaturated organopolysiloxanes, with the proviso that said slip agent must possess a melting point lower than the polyesters forming said multilayer film.

12. The substantially scratch-free, film of claim 1 wherein polyester cover layers having substantially the same composition and thickness are applied to both surfaces of said polyester substrate.

* * * * *